United States Patent
Janakirama Rao

[15] 3,652,303
[45] Mar. 28, 1972

[54] HEAT ABSORBING BLUE SODA-LIME-SILICA GLASS

[72] Inventor: Bhogaraju V. Janakirama Rao, Aspinwall, Pa.

[73] Assignee: PPG Industries, Inc., Pittsburgh, Pa.

[22] Filed: Jan. 26, 1970

[21] Appl. No.: 5,796

[52] U.S. Cl. ................................. 106/52, 106/47 Q, 65/32, 156/100
[51] Int. Cl. ........................................ C03c 3/04
[58] Field of Search ................ 106/52, 47 Q; 65/32, 134; 252/300; 156/100

[56] References Cited

UNITED STATES PATENTS

| | | | |
|---|---|---|---|
| 3,145,115 | 8/1964 | Weidel | 106/52 |
| 3,300,351 | 1/1967 | Richardson | 106/52 X |
| 3,326,703 | 6/1967 | Harrington | 106/52 X |
| 3,345,190 | 10/1967 | Albinak et al. | 106/52 X |
| 3,423,197 | 1/1969 | Loukes et al. | 65/32 |
| 3,482,955 | 12/1969 | Monks | 106/52 X |
| 3,506,422 | 4/1970 | Walters | 65/32 X |

Primary Examiner—James E. Poer
Assistant Examiner—W. R. Satterfield
Attorney—Chisholm and Spencer

[57] ABSTRACT

Blue, heat absorbing glasses, particularly infrared absorbing glasses, which have high transmission in the visible portion of the spectrum and are suitable in flat form for use in the automobile, architectural and other heat-shielding applications are disclosed. These glasses consist essentially of lime, soda, silica, 0.05 to 2.0 percent of iron, said iron being in an ionic state, at least 80 percent of which is in the ferrous state, and 0.1 to 15.0 percent tin, a major portion of which is in the stannous state, the ratio of stannous to ferrous ion on a mole percent bases being at least 1:1.

2 Claims, 1 Drawing Figure

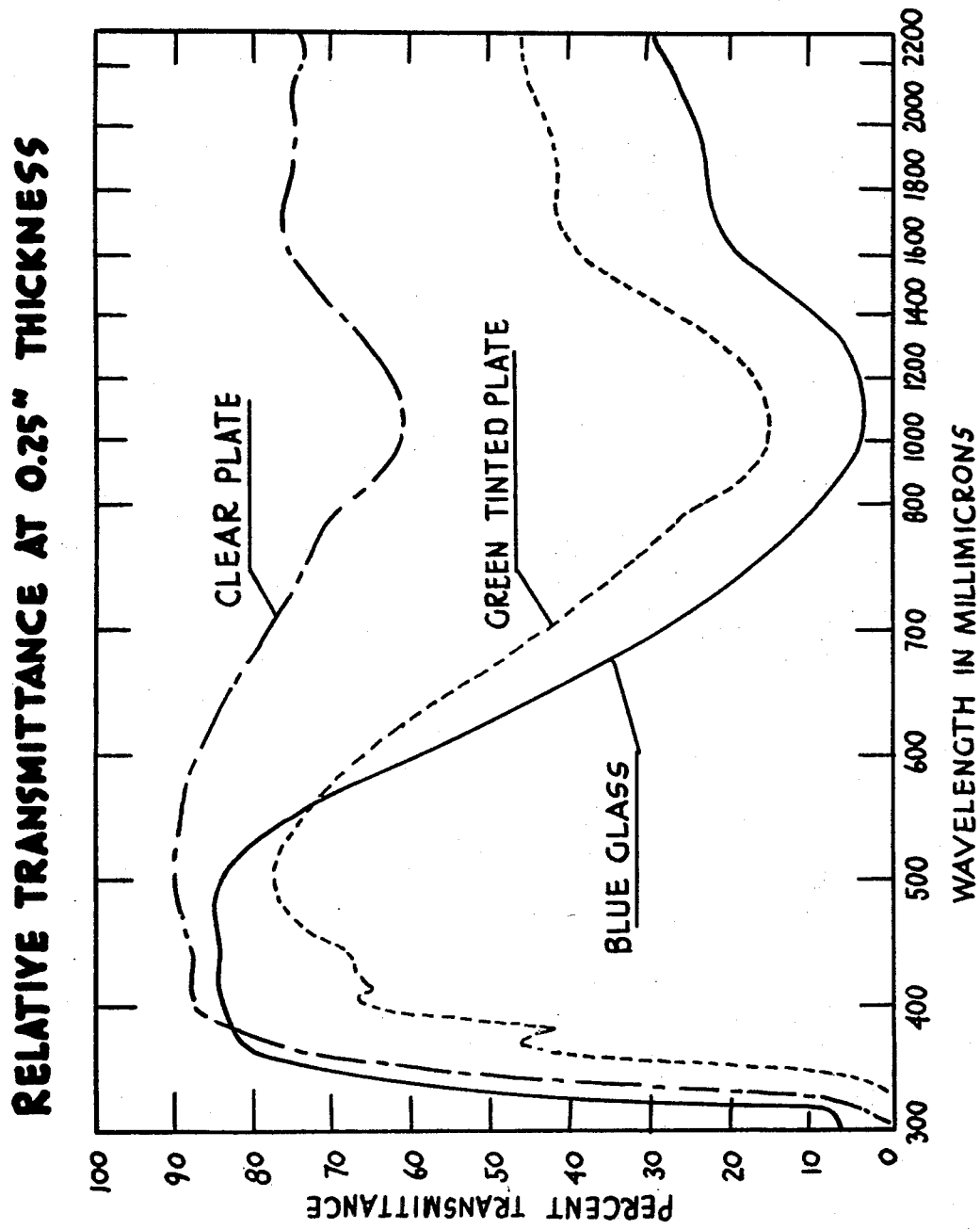
INVENTOR
BHOGARAJU V. JANAKIRAMA RAO
BY *Chisholm and Spencer*
ATTORNEYS

HEAT ABSORBING BLUE SODA-LIME-SILICA GLASS

BACKGROUND OF THE INVENTION

This invention relates to blue, heat absorbing glasses, particularly infrared absorbing flat glasses which have controlled energy and light transmittance characteristics, as well as viscosity versus temperature characteristics suitable for flat glass drawing by modern methods.

In the manufacture of infrared absorbing automobile and architectural glass, practical problems are encountered in stabilizing the equilibrium of the ferrous ion which is responsible for the infrared absorption around 1,100 millimicron wavelength. Iron can exist in various valence states in glass, according to its oxidation-reduction equilibria:

$$Fe^0 \rightleftharpoons Fe^{+2} \rightleftharpoons Fe^{+3} \qquad (1)$$

By maintaining a reducing or oxidizing environment, the pertinent equilibrium in equation (1) can be shifted in the desired direction. Since the magnitude of the infrared absorption band at 1,100 millimicron wavelength is a function of the $Fe^{+2}$ ion concentration in glass, it would appear that a high concentration of $Fe^{+2}$ ion would be required. While this is theoretically correct, the fact that $Fe^{+2}$ ion gives rise to blue color in the visible spectrum, limits its permissible concentration in glass.

The use of tin in association with iron helps to retain iron in its ferrous state in glass. This principle has been utilized by the prior art in making heat-absorbing glass for use in welders' goggles. However, the use of the iron-tin combination to achieve maximum reduction and retention of available iron in its ferrous state in soda-lime-silica glass adaptable to mass production processes such as Float, Pennvernon, Fourcault and Colburn, is beset with practical problems associated with economy, efficiency and quality of the product. Such problems are surmounted in this invention. Glasses of this invention are essentially of the soda-lime-silica type, containing 0.05 to 2.0 percent by weight of iron and 0.1 to 15.0 percent by weight of tin. At least 80 percent of the total iron and a part of the total tin are retained in the glass in the $Fe^{+2}$ and $Sn^{+2}$ states respectively, the ratio of stannous to ferrous ion on a mole percent basis being at least 1:1.

Two earlier U.S. patents utilized the infrared absorption of the ferrous ion to produce heat-absorbing glasses. U.S. Pat. No. 1,737,686, whose primary objective was the manufacture of welders' goggles, used stannic oxide and carbon to reduce $Fe_2O_3$ in the batch of its ferrous state in glass. To counteract the tendency of carbon to produce the well-known carbon yellow color in the glass, additives of ZnO or CdO were recommended. Neither the carbon yellow nor the presence of ZnO or CdO are desirable in flat glass compositions. When composition D of the reference patent was melted in a "Lavasil" (99 percent Silica) crucible for 24 hours at 1450° C., it was observed that the three-eighths-inch thick and 4-inch diameter bottom of the crucible was completely dissolved by the molten glass. Such corrosive action would be disastrous in mass production melting. The viscosity of the glass was abnormally low because of its approximately 20 weight percent alkali content.

U.S. Pat. No. 3,326,703 used cornstarch in association with ZnO or CdO to reduce $Fe_2O_3$ in boro-alumino-silicate glasses. In these glasses, the presence of up to 20 weight percent $B_2O_3$ tends to oxidize iron and shift the equilibrium in equation (1) towards $Fe^{+3}$ and thus contribute to less efficient absorption in the near infrared. The very high softening temperatures of 800° to 900° C., compared with 700° C. of soda-lime-silica glasses, also give rise to serious problems in flat glass production.

Thus, none of the compositions in the cited references are suitable for heat absorbing flat glass manufactured by existing mass production techniques and equipment.

SUMMARY OF THE INVENTION

To achieve maximum efficiency in heat absorption without sacrificing visible transmittance, it is necessary to use the minimum amount of iron and *convert and retain* almost all of it in the ferrous state in glass. For use as an automotive windshield, heat-absorbing flat glass must conform to federal specification No. D D-G-451A, which stipulates a total solar energy transmittance of less than 50 percent and a visible light transmittance of greater than 70 percent at one-fourth inch thickness. For efficient heat absorption it is desirable to have close to zero percent transmittance at 1,100 millimicron wavelength. For use in an automobile windshield such a fine adjustment is possible by using 0.15 to 0.35 weight percent of iron calculated as $Fe_2O_3$ in the glass composition, and forcing 80–99 percent of the iron to stay in the $Fe^{+2}$ state in the glass.

One object of this invention is to provide a means to shift and retain the equilibrium in equation (1) at maximum $Fe^{+2}$ concentration so that a major portion of the total iron exists in its ferrous state in the glass, thereby making the glass an efficient heat absorber while retaining its visible transmittance at greater than 70 percent at one-fourth-inch thickness. I have discovered that the presence of excess of $Sn^{+2}$ in the glass is essential after the total conversion of $Fe^{+2}$ is achieved.

During the process of fabrication of flat glass, it is necessary to reheat the glass to the working temperature. The diffusion of oxygen from the air into hot glass and the consequent shift in the iron equilibrium partially towards $Fe^{+3}$ is prevented by the presence of excess of $Sn^{+2}$ ions in the glass. The presence of tin as $Sn^{+2}$ represents stored-up reducing power. $Sn^{+4}$ has no such stored-up reducing power.

Other objects of this invention are:

2. A new blue glass composition of the soda-lime-silica type, having a high heat absorbing efficiency wherein 80–99 percent of the total available iron is retained in the ferrous state in glass.

3. A new glass melting process which dispenses with the use of the traditional salt cake, niter, arsenic, etc. as fining agents in tank glass melting practice.

4. Heat-absorbing blue glass with viscosity versus temperature characteristics suitable for drawing into flat glass by modern mass production methods.

My invention results in 80 to 99 percent of the iron introduced into the glass batch being reduced and retained in its ferrous state. Maximum conversion to and retention of $Fe^{+2}$ in molten glass manufactured by conventional practice, without the use of traditional fining agents such as salt cake, niter, arsenic, etc., according to my invention, is achieved by the following techniques, either individually or in combination:

1. Addition of oxalic acid and ammonium chloride preferably in powder form to the glass batch containing iron and tin in any valence state.

2. Bubbling hydrogen gas or natural gas through the molten glass containing compounds of iron and tin.

3. Introduction of 0.05 to 2.0 percent by weight of metallic iron powder into the batch or cullet containing tin to effect the reaction:

$$Fe^0 \rightleftharpoons Fe^{+2} = +2e^- \qquad (2)$$

4. Introduction of 0.1 to 15 percent by weight of metallic tin powder into the glass batch or cullet containing iron to effect one or more of the reactions:

$$Sn^0 + 2Fe^{+3} \rightarrow Sn^{+2} + 2Fe^{+2} \qquad (3)$$
$$Sn^{+2} + 2Fe^{+3} \rightarrow Sn^{+4} + 2Fe^{+2} \qquad (4)$$
$$Sn^0 + 4Fe^{+3} \rightarrow Sn^{+4} + 4Fe^{+2} \qquad (5)$$

5. Introduction of 0.10 to 15.0 weight percent of SnO or $SnCl_2 \cdot 2H_2O$ into the glass batch to effect the reaction:

$$Sn^{+2} + 2Fe^{+3} \rightarrow Sn^{+4} + 2Fe^{+2} \qquad (6)$$

6. Introduction of an alloy of iron and tin in powder form, in the proportions desired, into the glass batch containing oxalic acid and ammonium chloride.

Nascent hydrogen is important in maintaining efficient reducing conditions. Therefore, in the place of bubbling nascent hydrogen, ammonium chloride or oxalic acid should be added to the glass batch to provide hydrogen. It is to be noted, however, that this invention employs no free carbon, thereby avoiding the color problems associated with the use of carbon. This invention has the advantage of avoiding the use of fining agents, including the conventional use of niter, arsenic and salt cake, which tend to oxidize $Fe^{+2}$ to $Fe^{+3}$.

BRIEF DESCRIPTION OF THE DRAWING

The drawing shows the energy transmittance characteristics of two glasses now marketed by PPG Industries, Inc., "clear plate" and "green tinted plate," and of "blue glass," subject of this patent. Between 350 and 750 millimicrons wavelength, essentially the visible portion of the spectrum, blue glass transmittance compares favorably with green tinted plate and clear plate while infrared transmittance by blue glass is around 10 percent, much less than clear or green tinted plate.

DESCRIPTION OF THE PREFERRED EMBODIMENTS

In accordance with the preferred embodiments of the present invention, a soda-lime-silica glass having the desired transmittance properties is provided. Such glass contains by weight 60 to 80 percent $SiO_2$, 10 to 20 percent $Na_2O$, 0 to 10 percent $K_2O$, the sum of $Na_2O$ and $K_2O$ being 10 to 21 percent, 5 to 16 percent CaO, 0 to 10 percent MgO, the sum of CaO and MgO being 5 to 20 percent, 0.1 to 2 percent iron calculated as $Fe_2O_3$, 0 to 10 percent $Al_2O_3$, 0.1 to 2 percent Cl, and 0.1 to 15 percent tin calculated as $SnO_2$.

Preferred ranges of compositions to which the invention is applicable are as follows:

| COMPONENTS | Calculated Weight Percent | |
| --- | --- | --- |
| $SiO_2$ | 65–80 | 68–74 |
| $Na_2O$ | 10–15 | 11–14 |
| $K_2O$ | 0–5 | 0–1 |
| $Na_2O + K_2O$ | 10–16 | 10–15 |
| CaO | 5–15 | 6–13 |
| MgO | 0–10 | 1.5–4 |
| CaO + MgO | 10–16 | 10–15 |
| $Al_2O_3$ | 0–10 | 0–5 |
| $Fe_2O_3$ | 0.1–2 | 0.1–.5 |
| Cl | 0.1–2 | 0.1–1.5 |

$SiO_2$ is the glass former. Sodium oxide is present as a flux to reduce the melting temperature of the glass. Potassium oxide may be employed in place of a portion of the $Na_2O$, but the use of $Na_2O$ is preferred because it is less expensive. The total amount of alkali metal oxide in the glass should range from 11 to 16 percent by weight. CaO and MgO are also employed as fluxes. They are used to supplement the $Na_2O$ because they improve the chemical durability of the glass. The amount of alkaline earth metal oxides in the glass can range from 6 to 20 percent by weight.

Alumina may be present in the glass in varying amounts, depending mainly upon the manner in which the glass is formed. Alumina is employed to regulate the viscosity of the glass, improve its durability and prevent devitrification of the glass. Relatively small amounts of alumina, for example, less than 1.0 percent by weight, are employed when plate glass is cast from a pot or made in a tank and formed by rolling it horizontally between sizing rolls. However, when the glass is formed by drawing it vertically from the kiln of a tank over a drawer bar and upwardly between rollers (sheet glass), up to 5 percent by weight alumina can be employed. Usually, however, from 0.1 to 3.5 percent by weight alumina is employed when forming glass by the sheet or vertical drawing procedure.

Trace amounts of $TiO_2$ are frequently present, e.g., in amounts up to 0.05 percent by weight, as an impurity.

$Fe_2O_3$ is employed principally to provide the desired heat-absorbing properties to the glass.

The glasses of the invention can be produced from conventional glass making materials properly compounded and thoroughly mixed so as to yield, when reacted, glasses of the desired ultimate composition. Suitable batch materials include sand, soda ash, potassium carbonate, limestone, dolomite, aluminum hydrate, oxalic acid and ammonium chloride. Conventional fining agents such as salt cake, niter and arsenic are unnecessary.

Various size pots or furnaces can be employed and the melting temperatures and times will vary according to the amount being formed. Most important, however, is that the glass can be formed continuously in flat form when made in a conventional tank for melting and refining glass to be formed by the sheet, float or plate process.

EXAMPLE

| Batch Ingredient | Weight Parts (for batch) (pounds) |
| --- | --- |
| Sand | 730 |
| Soda Ash | 235 |
| Limestone | 57.4 |
| Dolomite | 91 |
| $Al(OH)_3$ | 18 |
| $SnCl_2 \cdot 2H_2O$ | 50 |
| $Fe_2O_3$ | 2.5 |
| Oxalic Acid | 8 |
| Ammonium Chloride | 12 |

In the above batch, metallic iron powder can be substituted for the $Fe_2O_3$ and/or metallic tin could be substituted for the $SnCl_2 \cdot 2H_2O$, or alloys of iron and tin could be used. As an added means of attaining reducing conditions, hydrogen gas or natural gas could be bubbled through the molten glass.

A 3,610 pound glass batch, which is illustrative of the present invention, is prepared by thoroughly mixing the indicated proportions of the above batch ingredients. This pot batch yields approximately 3,000 pounds of glass after melting and refining, which amounts to 600–800 square feet of plate glass at five-sixteenths-inch thickness.

In melting 3,610 pounds of the above batch, a refractory pot is heated to 2,600° F. in a gas fired furnace. The batch is then added to the pot in 2 hour intervals; 4–5 fillings should be enough, so that all the batch is in the pot after about 10 hours. The temperature is then raised to 2,700° F. for approximately 10 hours, and the batch is stirred. The stirrer is then removed, and the glass allowed to melt and refine for 5 hours at 2,600° F. The furnace temperature is then dropped to 2,300° F. and held there for six hours before casting. The glass is then cooled to the casting temperature of 2,150° F. Finally, the glass, which should now be clear and free of seeds, is cast.

The oxide composition of the above-given batch is as follows:

| Component | Wet Chemical Analysis Percent | Calculated Percent By Weight |
| --- | --- | --- |
| $SiO_2$ | 70.18 | 70 |
| $Na_2O$ | 12.46 | 12.5 |
| CaO | 8.26 | 8.5 |
| MgO | 3.16 | 3.3 |
| $Al_2O_3$ | 1.40 | 1.25 |
| $SnO_2$ | 3.36 | 3.0 |
| $Fe_2O_3$ | 0.26 | 0.25 |
| $Cl^-$ | 0.92 | 1.20 |
| Total | 100.00 | 100.00 |

ABSORPTION SPECTROPHOTOMETRIC ANALYSIS

| Component | Percent by Weight |
| --- | --- |
| Total Fe as $Fe_2O_3$ | 0.256 |
| $Fe_2O_3$ | 0.027 |
| FeO | 0.206 |

A one-fourth-inch thick polished plate sample of a glass made by the pot method when subjected to optical and spectral transmittance measurements yields the following values:

| Property | Percent |
| --- | --- |

| | Luminous Transmittance | 74.1 |
|---|---|---|
| | Total Solar Infrared Transmittance | 10.9 |
| | Total Solar Energy Transmittance | 39.8 |

The transmittance characteristics of the above are shown in the accompanying drawing as the "blue glass."

By varying the amount of $Fe_2O_3$ in the example soda-lime-silica glass, transmittance characteristics can be altered. The following table reflects the changes caused by varying $Fe_2O_3$ content:

| | Lbs. $Fe_2O_3$ in glass batch | Percent liminous transmittance | Percent total solar infrared transmittance | Percent total solar energy transmittance |
|---|---|---|---|---|
| Glass No.: | | | | |
| 1 | 2.0 | 75.5 | 13.6 | 42.1 |
| 2 | 2.5 | 74.1 | 10.9 | 39.8 |
| 3 | 3.0 | 72.9 | 8.5 | 37.9 |
| 4 | 3.5 | 70.4 | 6.1 | 35.2 |

Glass numbers 1 to 4 were melted according to the preferred embodiment of the invention.

Glass number 2 is the "blue glass" shown in the accompanying drawing. The table shows how luminous transmittance decreases and heat absorption increases with increasing $Fe_2O_3$ content.

The special transmittance measurements of the glasses of the present invention are made by standard spectrophotometric methods. A Beckman Quartz Spectrophotometer, Model DK-2A, is used for wavelengths between 300 and 2,300 millimicrons.

Although the present invention has been described with reference to specific details of certain embodiments, it is not intended that such details act as limitations upon the scope of the invention except insofar as included in the accompanying claims.

I claim:

1. A blue glass article, which has viscosity versus temperature characteristics suitable for drawing into flat glass by modern plate, sheet and float glass mass production methods, and which has a total solar energy absorbence of less than 50 percent and a visible light transmittance of greater than 70 percent at one-fourth inch thickness consisting essentially of, by weight:
  a. 60 to 80 percent $SiO_2$;
  b. 10 to 20 percent $Na_2O$;
  c. 0 to 10 percent $K_2O$, the sum of $Na_2O$ and $K_2O$ being 10 to 21 percent;
  d. 5 to 16 percent CaO;
  e. 0 to 10 percent MgO, the sum of CaO and MgO being 5 to 20 percent;
  f. 0.1 to 2 percent iron;
  g. 0 to 10 percent $Al_2O_3$;
  h. 0.1 to 2 percent Cl;
  i. 0.1 to 15 percent tin;

wherein more than 80 percent of the iron in the glass is retained in its ferrous state, a major portion of the tin being in its stannous state, and the ratio of stannous to ferrous ion on a mole percent basis being at least 1:1.

2. A transparent glass according to claim 1 consisting essentially by weight of 65 to 80 percent $SiO_2$, 10 to 15 percent $Na_2O$, 5 to 15 percent CaO, 0 to 10 percent MgO, and 0 to 10 percent $Al_2O_3$.

* * * * *